United States Patent [19]

Campbell et al.

[11] Patent Number: 5,348,141
[45] Date of Patent: Sep. 20, 1994

[54] MATERIAL HANDLING SYSTEM

[75] Inventors: Bruce J. Campbell, Arden; Mark D. Campbell, Asheville, both of N.C.

[73] Assignee: Campbell Machines Company, Swannanoa, N.C.

[21] Appl. No.: 160,357

[22] Filed: Nov. 29, 1993

Related U.S. Application Data

[63] Continuation of Ser. No. 889,489, May 27, 1992, abandoned.

[51] Int. Cl.$^5$ .............................................. B65G 17/12
[52] U.S. Cl. ............................. 198/801; 198/803.14
[58] Field of Search ............... 198/469.1, 473.1, 483.1, 198/485.1, 560, 563, 803.14, 803.15, 478.1, 481.1, 466.1, 468.8, 803.11, 803.01, 389, 801

[56] References Cited

U.S. PATENT DOCUMENTS

| | | | |
|---|---|---|---|
| 294,015 | 2/1884 | Conrad | 198/801 X |
| 2,869,708 | 1/1959 | Nesseth | 198/801 X |
| 2,870,900 | 1/1959 | Will | 198/801 X |
| 3,184,032 | 5/1965 | Jonsson | 198/801 X |
| 3,294,217 | 12/1966 | Kay | 198/801 X |
| 3,499,519 | 3/1970 | Belk et al. | 198/801 X |
| 3,578,144 | 5/1971 | Punzak | |
| 3,651,985 | 3/1972 | Smith | |
| 3,670,865 | 6/1972 | Garland | |
| 3,710,926 | 1/1973 | Santen | |
| 3,770,107 | 11/1973 | Michelback | 198/803.14 X |
| 3,967,712 | 7/1976 | Waitkins et al. | |
| 3,983,990 | 10/1976 | Gardy | |
| 4,345,682 | 8/1982 | White et al. | 198/801 |
| 4,560,058 | 12/1985 | Enochs et al. | |
| 4,829,634 | 5/1989 | Keith et al. | |

FOREIGN PATENT DOCUMENTS

| | | | |
|---|---|---|---|
| 1261056 | 2/1968 | Fed. Rep. of Germany | 198/801 |
| 2277747 | 3/1976 | France | 198/801 |
| 0700930 | 12/1953 | United Kingdom | 198/483.1 |
| 0779405 | 7/1957 | United Kingdom | 198/469.1 |

*Primary Examiner*—James R. Bidwell
*Attorney, Agent, or Firm*—Carter & Schnedler

[57] ABSTRACT

A material handling system particularly adapted for irregular or headed workpieces having easily damaged surfaces. The handling system receives and takes away from a multitude of process machines, by elevating, conveying, storing and distributing in a singulated pocketed fashion so as not to cause damage to the workpieces. The system lowers the workpieces and accumulates them in a central fashion to provide a storage or staging area to keep a constant flow to the next process machine. Bifurcated L-shaped pick-up forks are used to elevate the workpieces to a horizontal conveyor which includes a plurality of adjacent pocketed carriers forming a continuous surface. Each carrier holds a single workpiece. The workpieces are individually removed from each carrier and are passed through a tube which centers the parts between a pair of adjacent belts for staging.

11 Claims, 14 Drawing Sheets

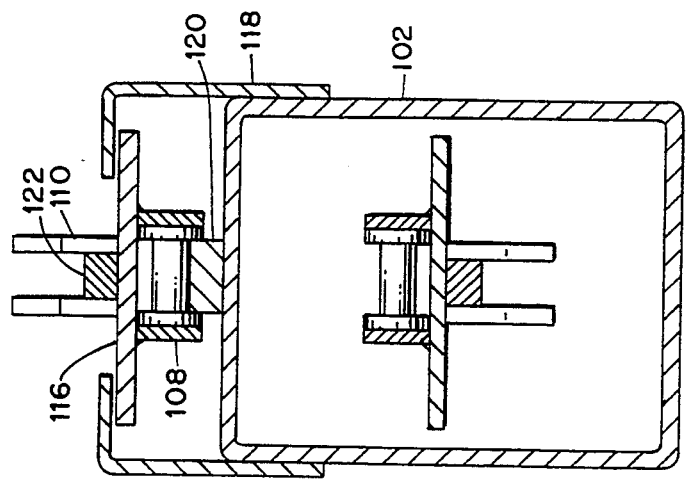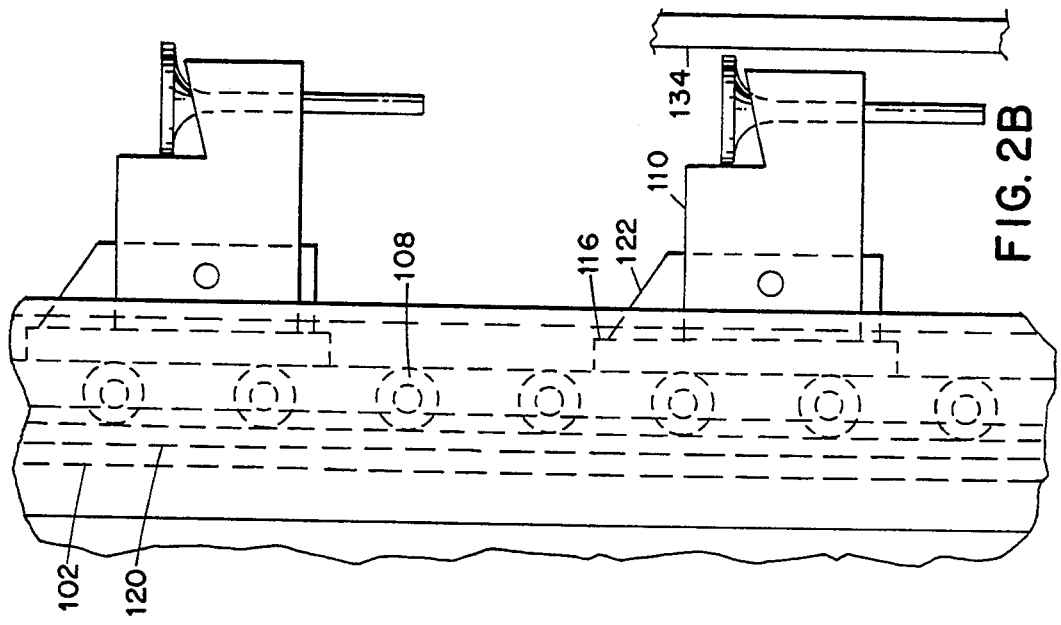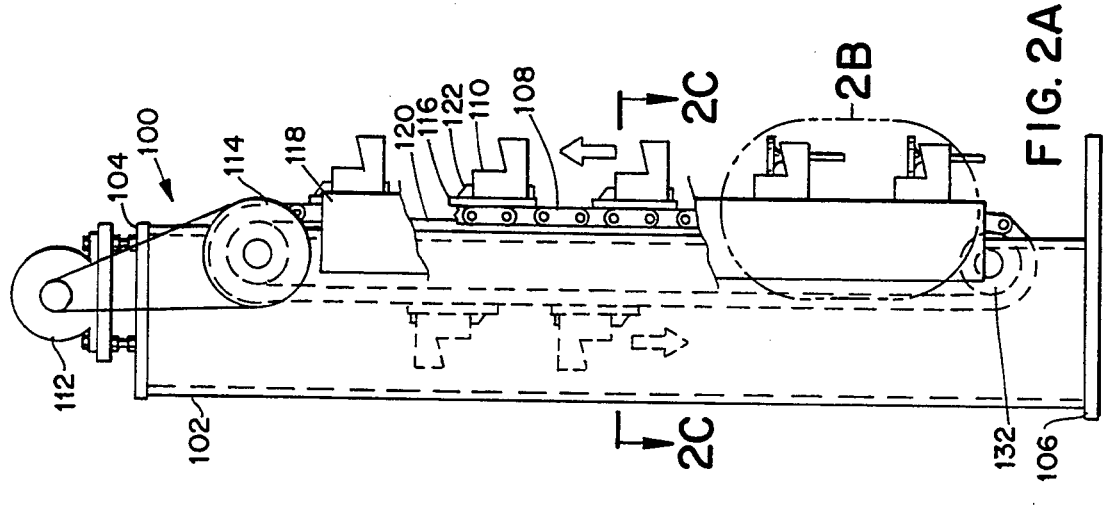

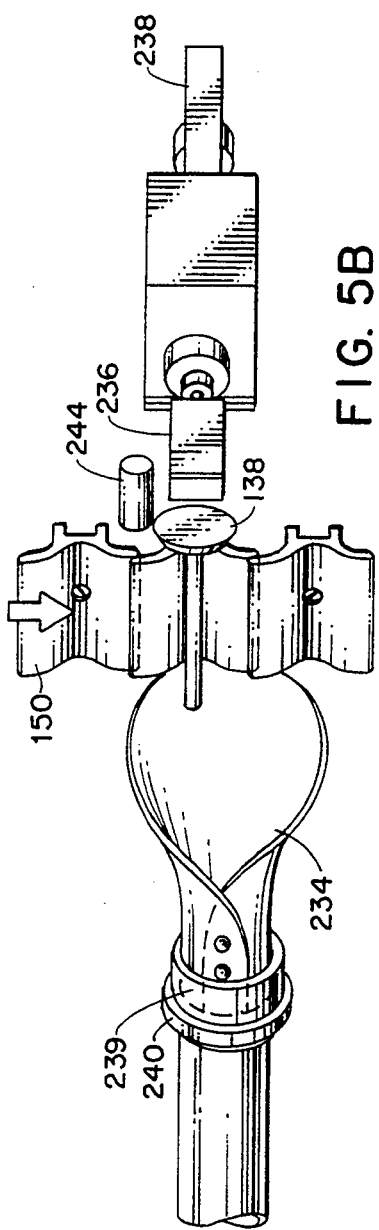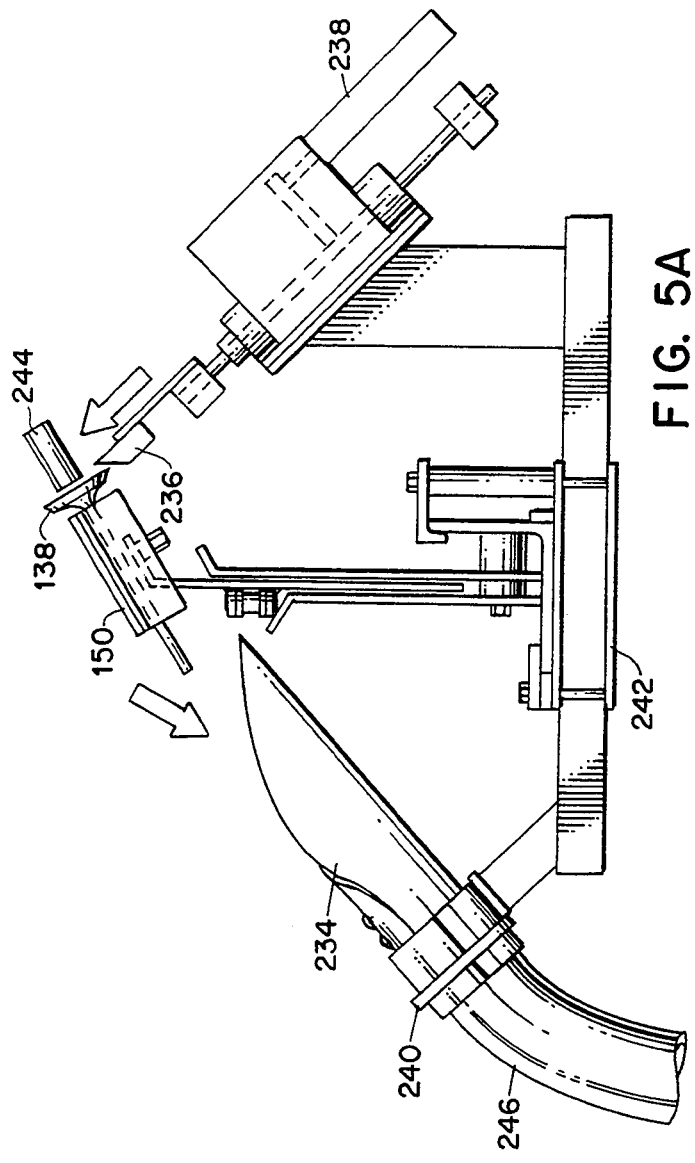

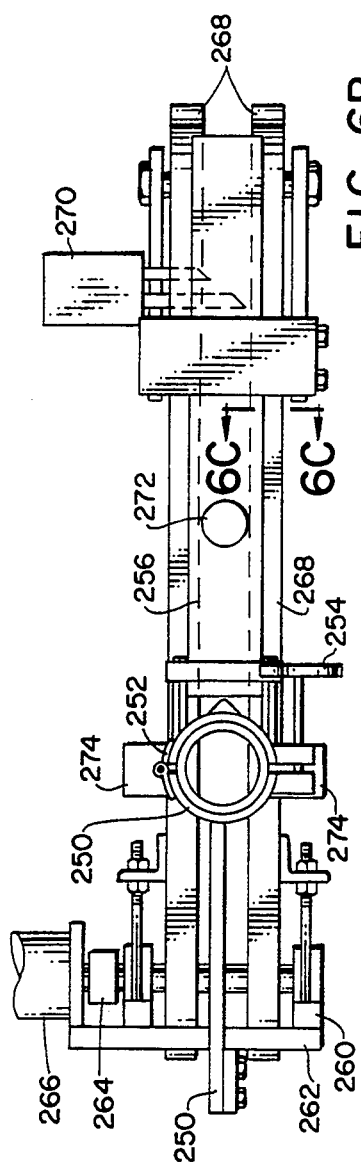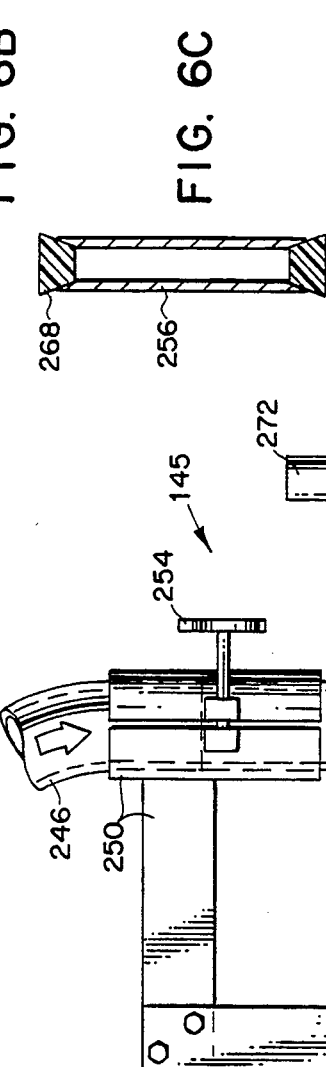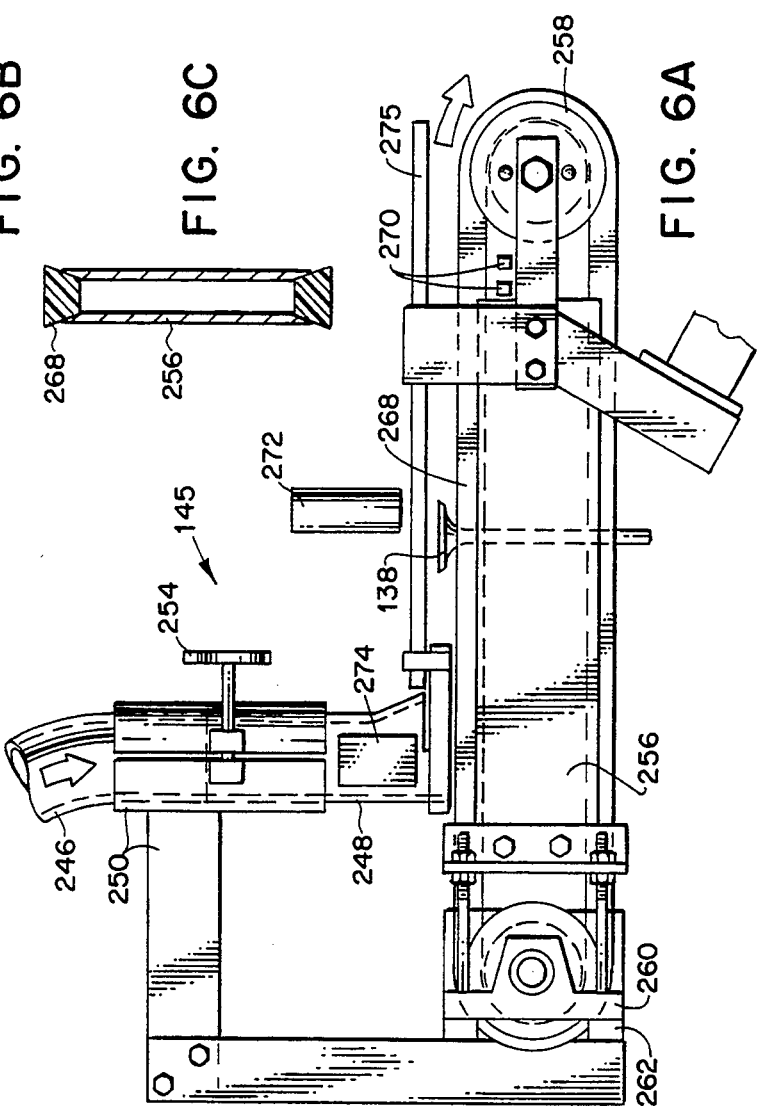

MATERIAL HANDLING SYSTEM

This is a continuation of application Ser. No. 07/889,489 filed May 27, 1992, now abandoned.

BACKGROUND OF THE INVENTION

This invention relates to material handling systems. More particularly it relates to material handling systems for conveying and staging parts which are subject to damage if roughly handled.

Manufactured parts such as engine valves are produced in plants in steps by various shaping, grinding and finishing machines. Because of the delicacy of these parts, it is not advisable to convey these parts from one machine to the other in bulk or the parts may come in contact with one another resulting in nicks, thereby destroying the preciseness of their manufacture. In addition, bulk conveyors and storage apparatus occupy substantial floor space in plants due to their nature and bulk situation.

OBJECTS OF THE INVENTION

It is therefore one object of this invention to provide a material handling system made of many sub-components which can be utilized separately, or collectively, to accomplish one or more functions.

It is another object to provide a material handling system that will accommodate a variety of sizes of commonly shaped workpieces.

It is another object to minimize the floor space required for a material handling system.

It is another object to provide a system that will keep the workpieces separate to eliminate damage and provide a unique accumulating component for a storage or staging area when necessary at the infeed of each process machine.

It is another object to provide a material handling system that can be assembled from the sub-components in a modular manner to make it relatively simple to move the system, expand, or make the system smaller depending upon the number of process machines required in each workcell.

It is another object to eliminate the need to use a common bulk feeding type apparatus for each process machine.

SUMMARY OF THE INVENTION

In accordance with one form of this invention there is provided a material handling system including a conveyor which is preferably oriented somewhat vertically forming an elevator. The conveyor includes an endless belt. A plurality of L-shaped pick-up forks are attached to the belt. The L-shaped pick-up forks include two spaced apart L-shaped components forming a nest. A gap is formed between the two L-shaped components. The gap enables parts to be conveniently placed in the nest and also permits feeding and removal mechanisms to be passed through the gap as the pick-up forks are moved.

In accordance with another form of this invention there is provided a material handling system which includes a plurality of carriers each having a pocket for receiving a part. The carriers form a substantially continuous upper surface. Each carrier includes a pair of wings which are at different elevations whereby wings from adjacent carriers will overlap permitting the carrier to readily make turns.

In accordance with another form of this invention there is provided a material handling system including a mechanism for removing parts from a carrier and placing the parts between a pair of adjacent belts. A tube is provided for receiving the parts from the carrier to orient the parts so that the parts may be placed between the belts where the parts are accumulated.

In accordance with another form of this invention a gating mechanism is provided to place individual parts on a carrier so that the parts do not contact one another.

A material handling system is thus provided which isolates the parts from one another thereby greatly reducing the possibility of damage to the parts.

BRIEF EXPLANATION OF THE DRAWINGS

The subject matter which is regarded as the invention is set forth in the claims. The invention itself, however, together with further objects and advantages thereof, may be better understood by reference to the following description taken in conjunction with the accompanying drawing in which:

FIG. 2A is a side elevational view of the elevator portion of the material handling system;

FIG. 2B is a more detailed illustration of the portion of FIG. 2A which is circled;

FIG. 2C is a sectional view of a portion of FIG. 2A taken through section A—A;

FIG. 3C is a sectional view of the gravity track shown in

FIG. 3A taken through section A—A;

FIG. 5A is a side elevational view showing the apparatus for removing the part from the carrier;

FIG. 5B is a top view of FIG. 5A;

FIG. 6A is a side elevational view showing the accumulator for the parts which are removed from the carrier as shown in FIG. 5A;

FIG. 6B is a top view of FIG. 6A;

FIG. 6C is a sectional view of a portion of FIG. 6B taken through line A—A;

DESCRIPTION OF THE PREFERRED EMBODIMENTS

Figure 1A:
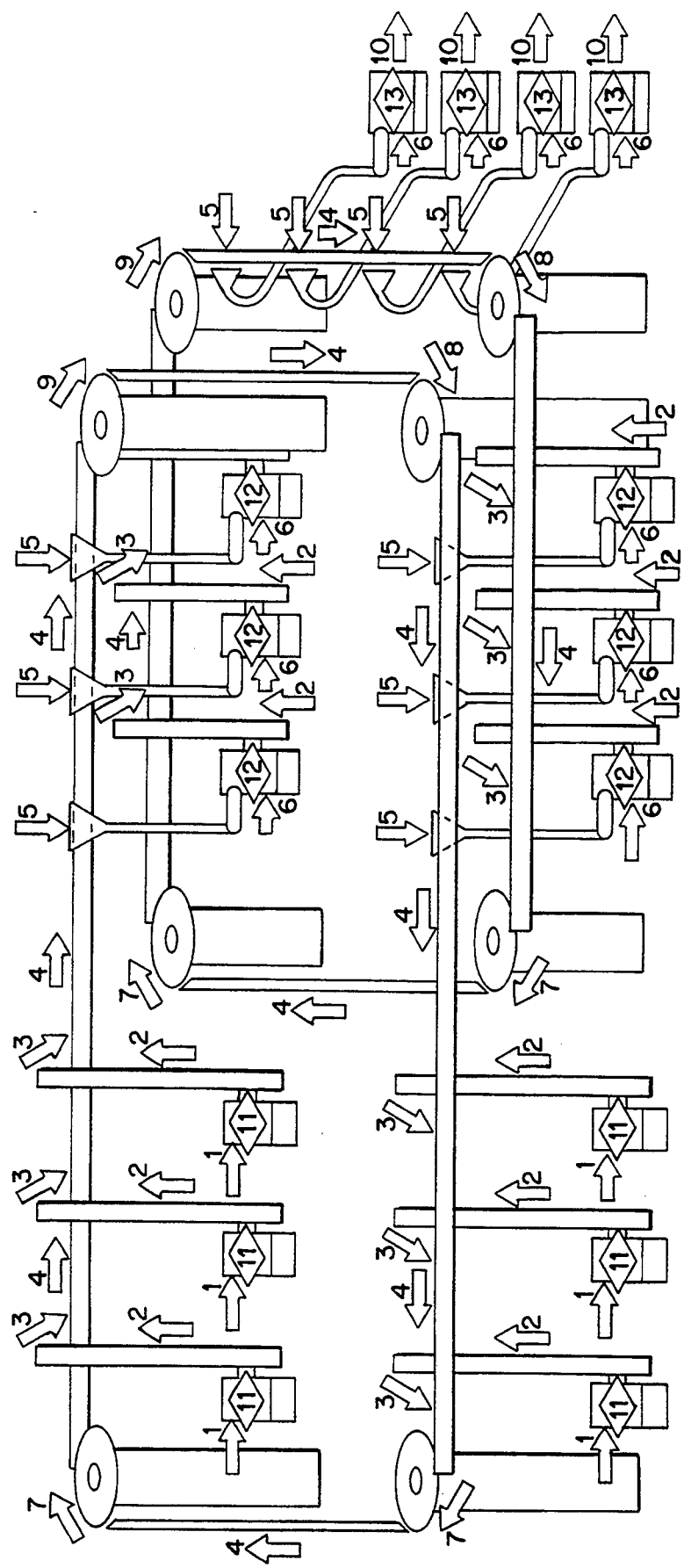
FIG. 1A illustrates a general floor layout which shows pictorially the different components that make up a typical application for using the material handling system of the subject invention; the arrows show the flow of the workpieces and have item numbers in them; the item number generally references to one or more of the figures set forth below which will better illustrate the configuration and function of that component; the item numbers inside a diamond shape relate to something else besides the material handling system, typically a workpiece process machine.

FIG. 1 depicts a schematic of a typical floor plan layout from an elevated view. The arrows show the flow of the workpieces through the material handling system. The workpieces are preferably headed parts such as engine valves. The arrows having numbers 2–6 correspond to one or more figures set forth herein. The numbers in the diamond shapes indicate a process machine or a position that the material handling system is distributing "to" or "from." The material handling system can be configured to accommodate as few or as many process machines in a workcell as required. The system runs on demand as the infeed of each process machine calls for which is done with electric sensing devices and a system controller commonly known to those skilled in the art such as an Allen Bradley PLC.

If the system gets too full, the take-away portions of the system will start to shut down and shut down the proceeding process machine or machines.

All take-away and delivery portions of the material handling system act independently according to the need of the individual process machines for the workpieces. The overhead conveyor runs continually or indexing.

Arrow 1 depicts the infeed of the parts to the first set of process machines. This can be done numerous ways—either by hand feeding, using a feeding machine, or by utilizing more of the same material handling system to infeed workpieces from another area of the facility. This is the beginning of the sequence of operations.

Figure 1B:
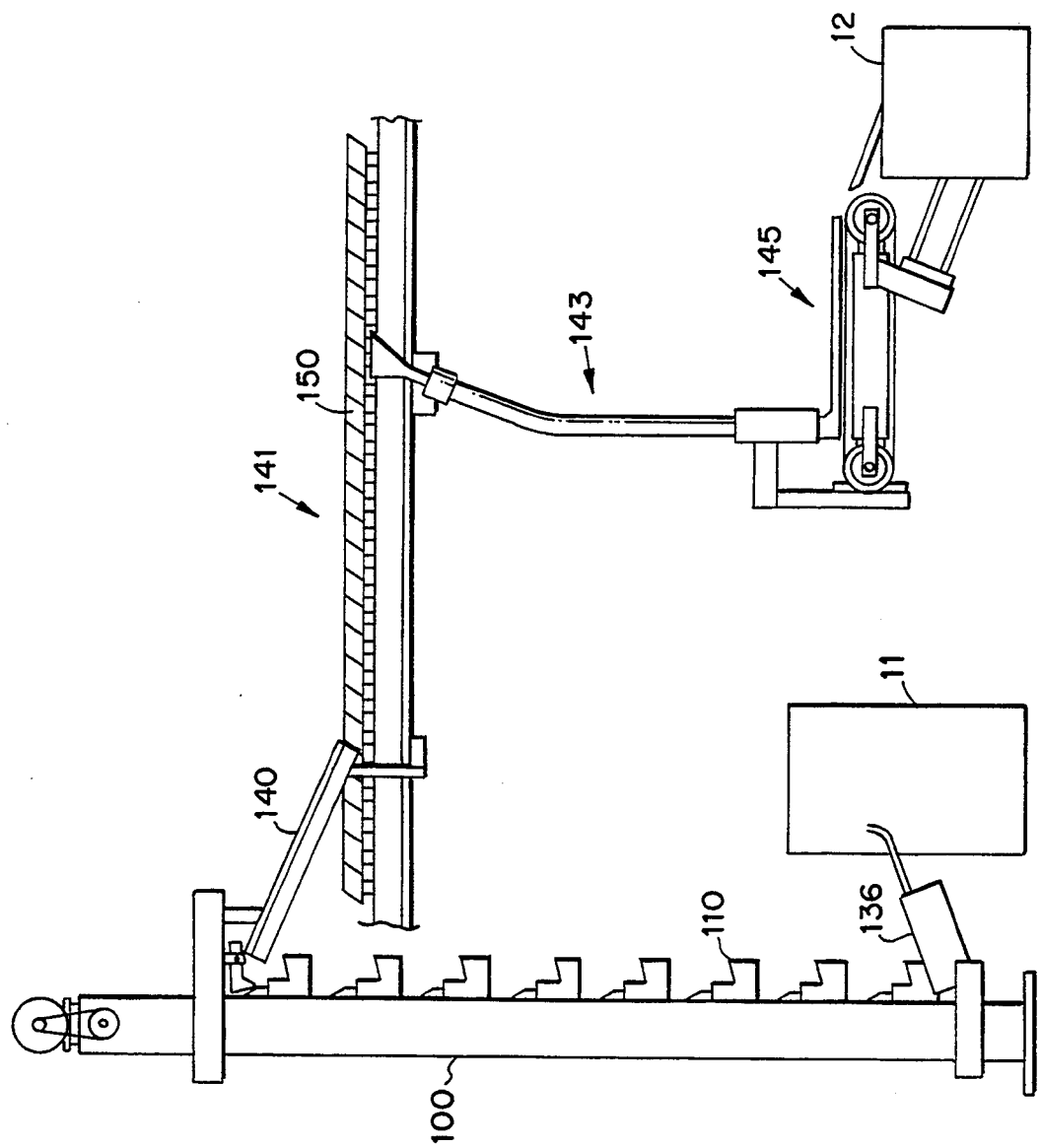
FIG. 1B is a simplified side elevational view of the material handling system of the subject invention showing the relationship of each subsystem.

Referring now to FIG. 1B, which shows the relationship among each of the systems, block 11 represents a process machine within a workcell for performing a manufacturing operation, such as grinding, on workpieces. The workpieces are placed from process machine 11 onto track 136. The parts are fed onto elevator 100 from track 136 and are received individually on forks 110. After the parts are elevated they are removed from the elevator, and thus from the forks, onto track 140. From track 140 the parts are fed one at a time onto horizontal conveyor 141. After being conveyed to a predetermined position by conveyor 141 the parts are removed therefrom through unloading apparatus 143. From unloading apparatus 143 the parts are placed on receiver/accumulator 145 so that the parts are in a position in the plant to be further manufactured or refined at process machine 12 within the next workcell.

FIGS. 2A to 2F illustrate elevator 100 that is utilized for taking workpieces away from a process machine and elevating them so they can be delivered to the horizontal conveyor. Elevator 100 includes a rectangular tube 102, top plate 104, and base plate 106 with cutouts in the tube to pass the chain 108 and the fork type carriers 110. Motor 112 is provided with a drive sprocket mounted on jack screws for chain tension. A sprocket, head shaft, clutch and roller chain is illustrated as item 114.

Guide rail 118 which is welded or affixed to the tube 102 serves both as a guard and stabilizer for the flight 116 which is welded or affixed to the chain 108. Guide 120 is welded or affixed to the tube 102 which guides the chain 108. The chain is a commonly purchased roller chain.

The flight 116 is welded or affixed to the chain and carried by the chain. Flight 116 is a plate of steel which stabilizes and provides a surface to attach a fixture or pick-up fork 110. A bar of steel 122 is welded or affixed to the flight 116 which gives the surface required to accommodate the pick-up forks 110.

The pick-up forks 110 can be made from steel, plastic or other material as required. If the application is for fragile workpieces such as engine valves, it is preferred that the pick-up forks be made of plastic such as high density polyethylene so that the surface of the workpieces will not be scratched. Pick-up forks 110 can be configured to the workpiece and the attitude in which the conveyor or elevator is to perform. Preferably the pick-up forks include a pair of L-shaped members 124 and 126 which are separated forming gap 128. The L-shaped members include substantially vertical leg 131 and substantially horizontal leg 133. Nesting surface 135 of leg 133 is preferably at an angle more than 0° from the horizontal to help stabilize the part 138. The L-shaped members are attached to steel bar 122 by frangible pins 130. Pin 130 will break if one or both of the L-shaped members become jammed against an object so that the elevator will continue to operate. The elevator can perform at any angle attitude and at any radial orientation from horizontal to vertical and anywhere in between and with the forks being down, sideways, or up or anywhere in between. The chain can be run in either direction—meaning either to or away from the drive end of the conveyor. The capability of the conveyor to run at any attitude is due to the L-shaped configuration of the pick-up forks 110 and to the stabilizer rail 118 which stabilizes flight 116 and the fact that the chain 108 is stabilized or guided by the stabilizer and guide 120.

Take-up arrangement 132 includes slotted frame bearings and a common take-up screw arrangement. A guide rail 134 can be utilized if the conveyor is used at an attitude in which gravity would have the workpiece fall out of the forks 110.

Figure 2E:
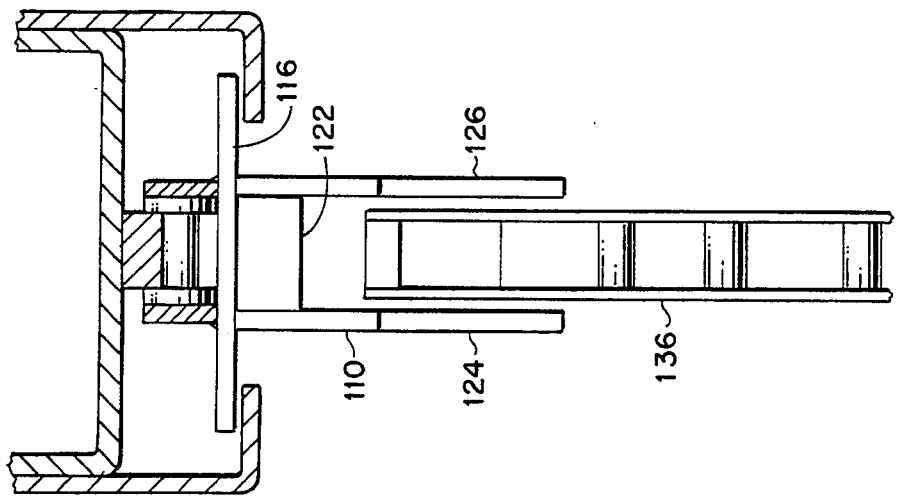
FIG. 2E is a sectional view of a portion of FIG. 2D taken through section A—A, however with the part removed.
Figure 2D:
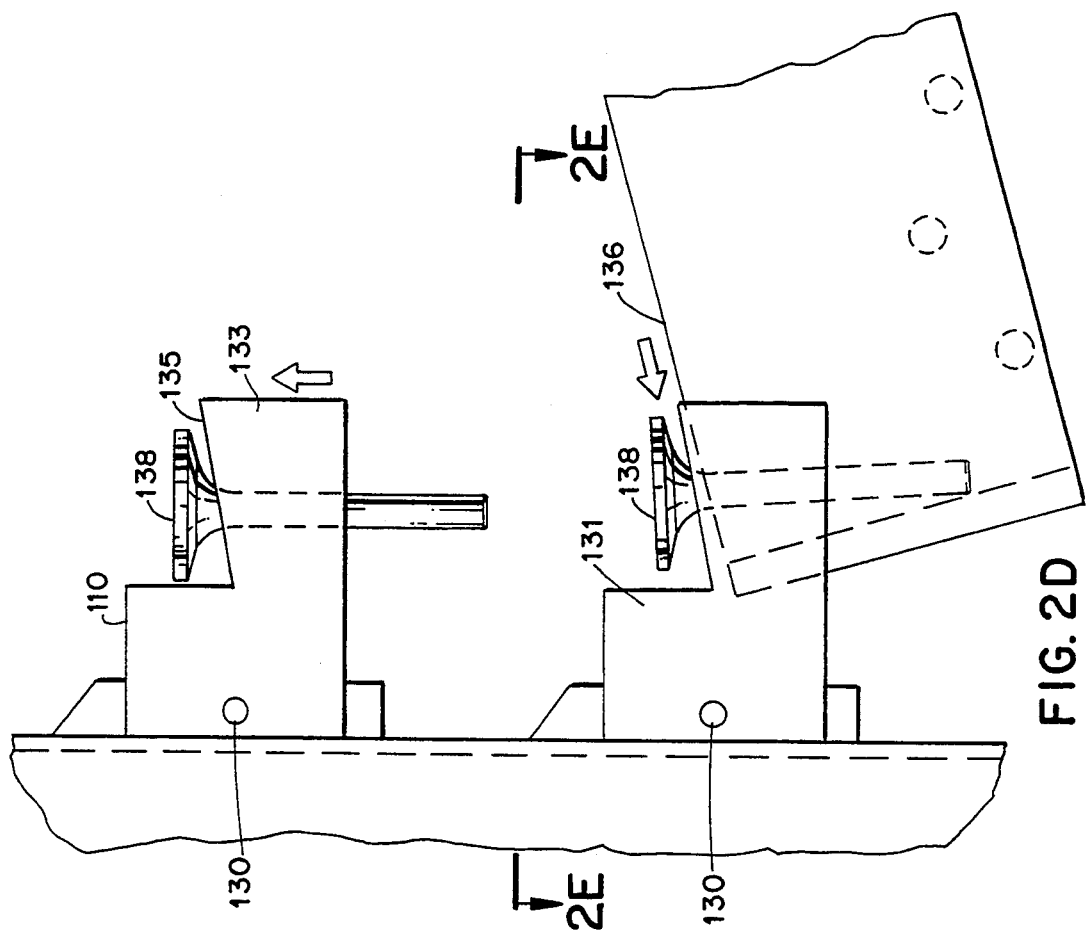
FIG. 2D shows a portion of the elevator shown in FIG. 2A together with the mechanism for conveying the parts to the elevator.

FIGS. 2D and 2E illustrate a track 136 onto which the workpieces are discharged and slide down due to gravity. At the pick-up point of the track 136, the outside measurement of the track is less than the inside measurement of the pick-up forks or nests. As the pick-up forks pass through the pick-up point of the track 136, the head of the workpiece 138 is captured by the pick-up fork 110. If for some reason something catches L-shaped member 124 or 126 of the pick-up fork and breaks off the bolt 130, which can be plastic also if necessary, both members 124 and 126 will fall off.

The configuration of the pick-up forks 110, the bar 122 and the flight 116 allows the pick-up forks 110 to be held straight and square with the one or more bolts 130.

Figure 3A:
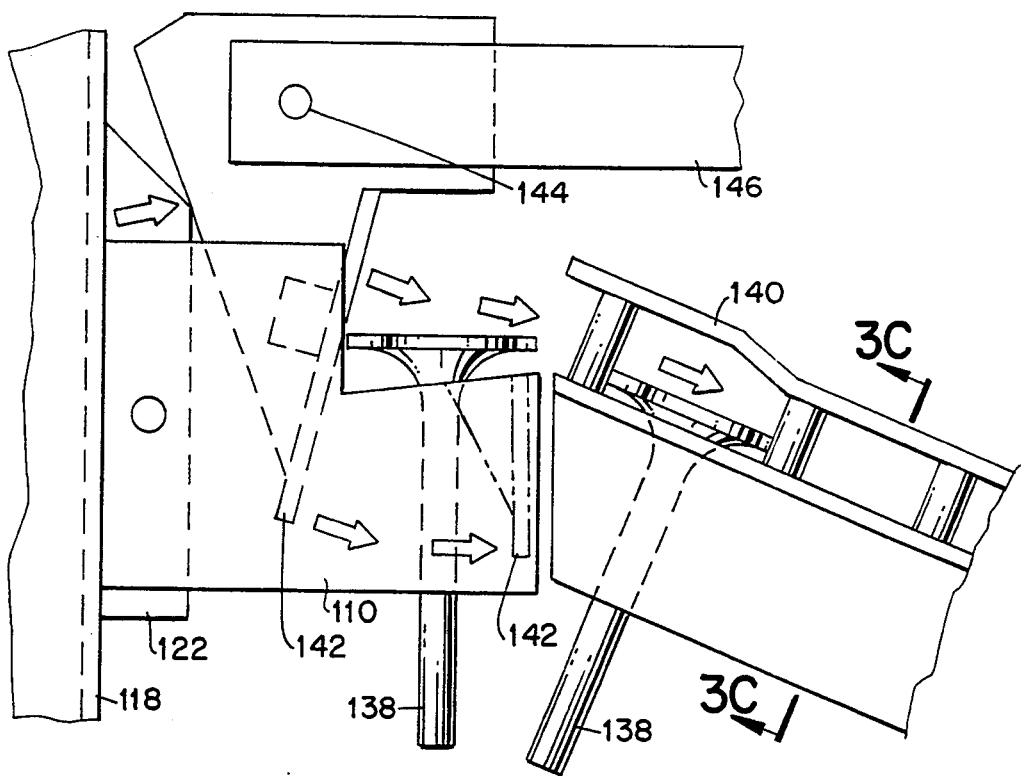
FIG. 3A is a partial side elevational view showing a portion of the elevator of FIG. 2A with an adjacent gravity track for unloading the parts from the elevator.
Figure 3B:
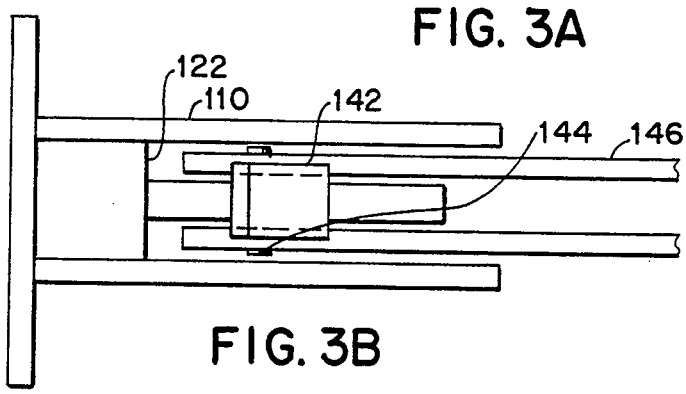
FIG. 3B is bottom view of FIG. 3A, however with the part removed for clarity.
Figure 2F:
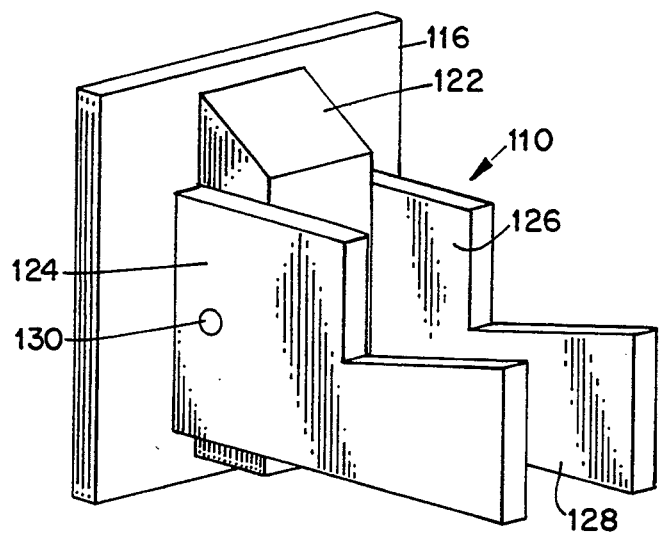
FIG. 2F is a pictorial view illustrating one of the pick-up forks shown in FIG. 2A.
Figure 3C:
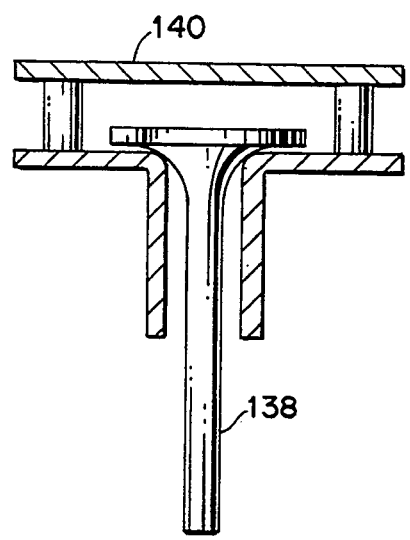

FIGS. 3A-3C shows an unload apparatus for the pick-up forks 110 when the elevator 100 is at an attitude such that the workpiece will not fall out due to gravity when a guide rail 134 (see FIG. 2B) is removed. The workpiece 138 is kicked off the fork 110 into a track, either powered, or a gravity track 140 as shown here. The workpiece is kicked out and off the pick-up fork 110 by the cam configuration of the kicker 142 which pivots on a pin 144 and activates each time the angled surface on the top of the bar 122 comes in contact with the kicker 142. The kicker 142, the pivot pin 144, and the mounting 146 are thinner on the outside dimension than the inside dimension formed by gap 128 between members 124 and 126 so that the pick-up forks 110 can pass over the kicker 142.

The pick-up forks 110 are configured in such a manner that the workpiece 138 does not come in contact with the bar 122 which is steel. Also, the gap 128 in the pick-up forks leaves room behind the workpiece 138 to allow room for the kicker 142.

Figure 3D:
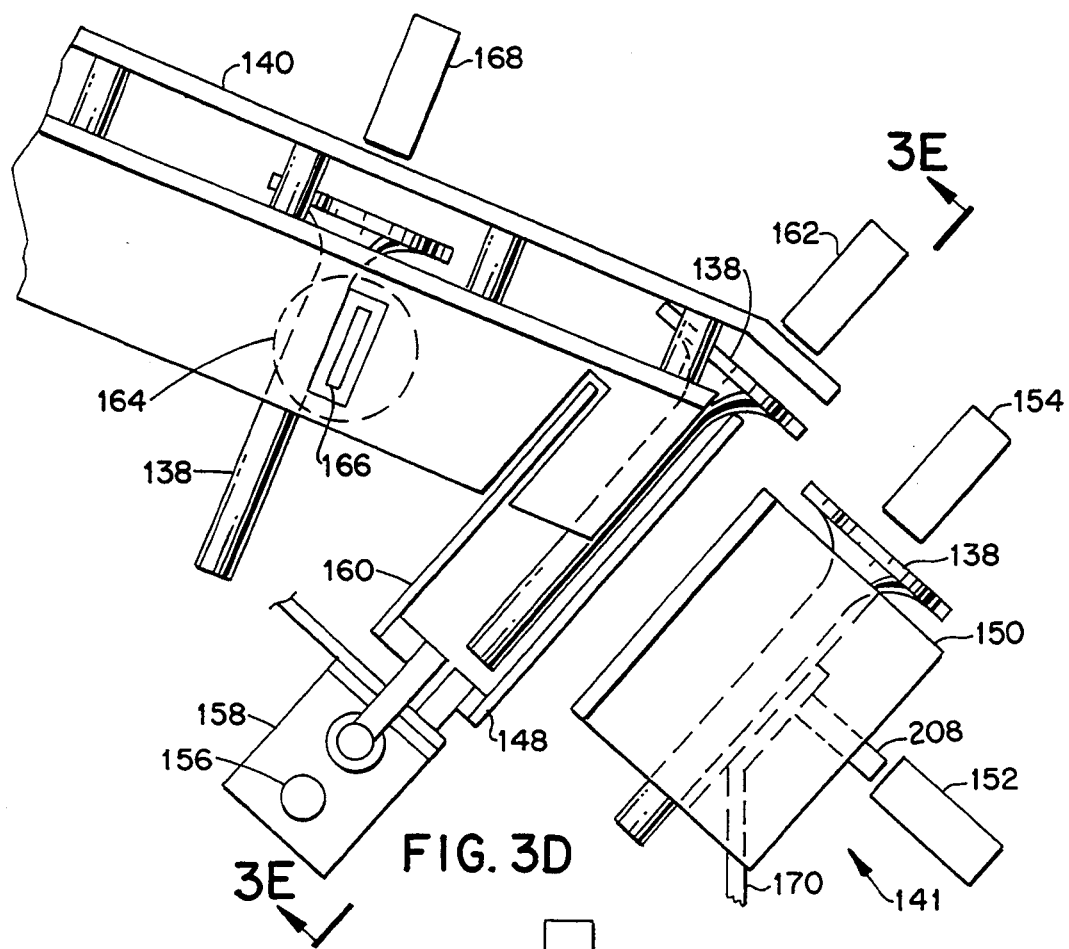
FIG. 3D is a side elevational view showing a portion of the gravity track of FIG. 3A, and the apparatus for moving parts to the horizontal conveyor.
Figure 3E:
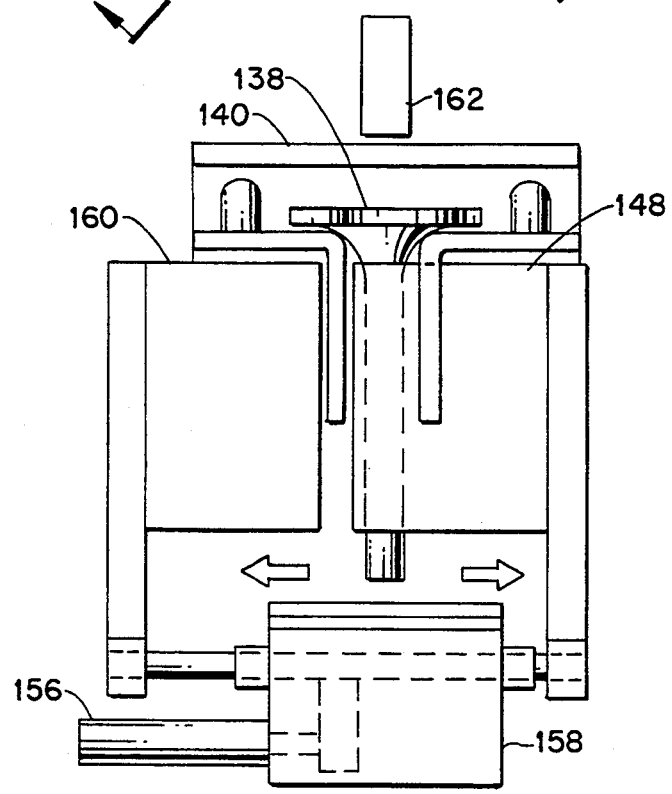
FIG. 3E is a sectional view of FIG. 3D taken through section A—A.

FIGS. 3D and 3E illustrate apparatus for loading the horizontal conveyor 141 through gravity track 140. Gravity track 140 and the escapement finger 148 holds a workpiece 138 in a "to be loaded" position. Conditions for loading are that a carrier 150 is sensed to be in position to be loaded by the use of a sensor 152. Sensors 152 as well as the other sensors referred to herein are preferably inductive proximity switches for sensing the presence of metallic material and are commercially available from many sources such as Efector, Inc. Also, there must not be a workpiece in the carrier 150 at the time of loading as determined by sensor 154. Sensor 152 reads a protruding nut or stem attached to carrier 150 and/or a part of the chain 156 as the carrier 150 goes by. Sensor 154 reads the presence or absence of a workpiece on carrier 150.

If sensors 152, 154 and 162 indicate that conditions are correct for loading, the system controller (not shown) will send a signal to operate an air cylinder 156 by way of a solenoid air valve, to open gate or finger 148.

A framework 158 which utilizes bearings and a shaft provides a means to connect the escapement fingers 148 and 160. The air cylinder is connected by a cross-link bar to the shaft and connects the escapement fingers 148 and 160 together and to the cylinder 156 without putting lateral loads onto the cylinder 156. To load a workpiece, escapement finger 148 acts as a gate and when the cylinder 156 moves, finger 148 moves out of the way of workpiece 138 and by gravity the workpiece moves onto carrier 150. When finger 148 moves out of the way, finger 160 moves into the path of workpieces so not more than one workpiece is loaded onto carrier 150.

Once the sensor 162 no longer senses a workpiece, the escapement fingers return so that finger 148 is blocking the track 140. Sensor 162 will now communicate to a solenoid air valve (not shown) that operates another air cylinder 164 to which another escapement finger 166 is affixed and retracts out of the pathway of the workpiece 110. If there is not a workpiece adjacent to finger 166 which is sensed by sensor 168, the escapement finger will remain in a blocking position, keeping the path closed. This is to prevent two workpieces traveling down to the position adjacent to finger 148. When a workpiece arrives at gate 166 and there is not a workpiece by finger 148, finger 166 will immediately retract thereby clearing a path.

If there is a workpiece adjacent to finger 148 and one adjacent to finger 166 for a short period of time, the elevator 100 which is elevating the workpieces will be shut off. The system controller receiving a signal from Sensor 168 sends the timing and shut down signals to the elevator which prevents another workpiece being unloaded into the track 140 and hitting and damaging a workpiece adjacent to finger 166. If the elevator is shut down for a period of time, the system controller will stop releasing parts into the process machine so that the process machine will not discharge more workpieces to the elevator. Infeed of the process machine is Item 9 shown on FIG. 1 and the elevating conveyor is Item 2.

Figure 4B:
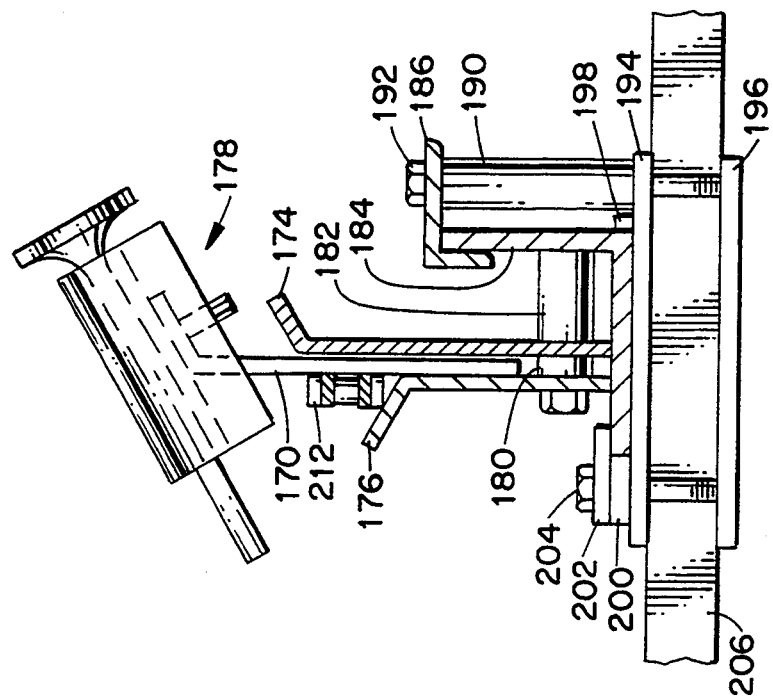
FIG. 4B is a sectional view of FIG. 4A taken through section A—A.
Figure 4A:
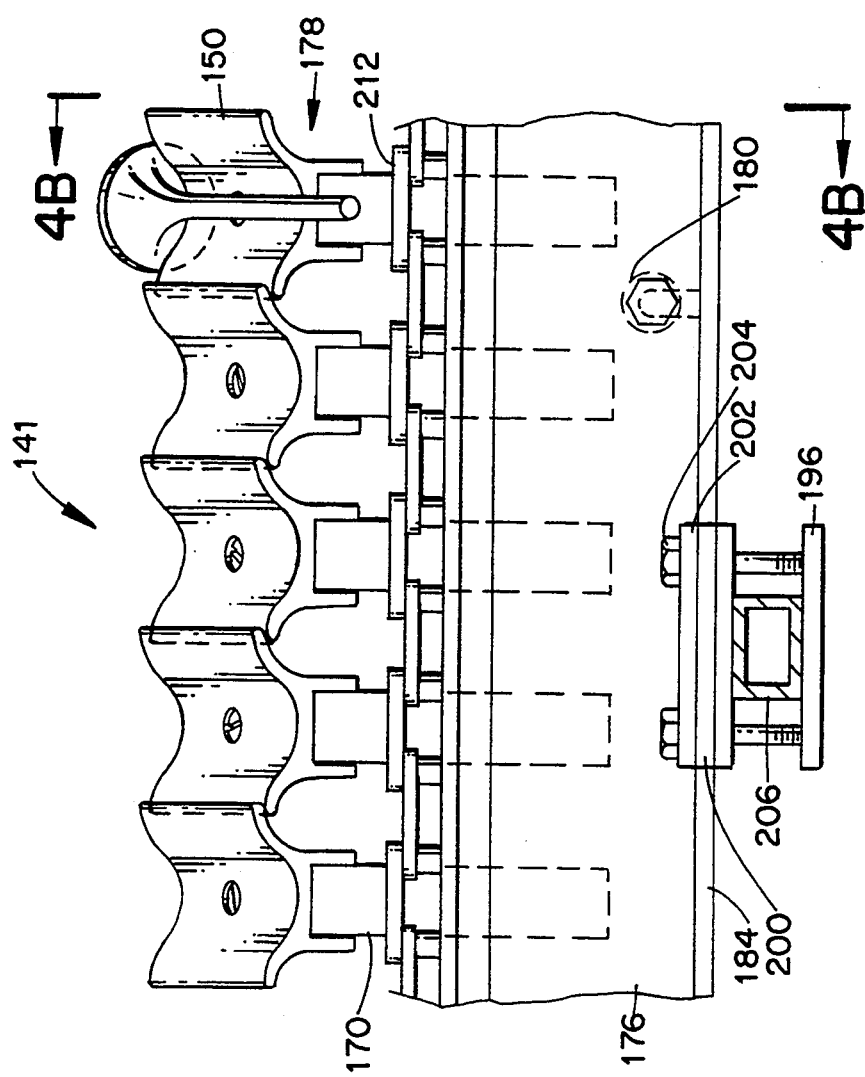
FIG. 4A shows portions of the horizontal conveyor including the adjacent carriers.

FIGS. 4A-4I show portions of the overhead conveyor including the chain assembly 178, flights 170, and carriers 150. Also shown in FIGS. 4A and 4B is a typical adjustable and sliding mount accommodated by the configuration of the conveyor slider bed 172. The slider bed 172 includes two formed wear resistant plates 174 and 176. Plate 176 supports the chain assembly 178. The chain assembly is hung by plate 176 by the roller chain portion of the chain assembly 178 and is held straight and square by the close fit of the flight 170 of the chain assembly 178 and plates 174 and 176.

The spacer 180 holds the gap between plates. Spacer 182 holds the distance between plate 174 and the angle frame 184 to utilize an angle clamp 186 which is held square by another spacer 190 which is tightened by bolt 192 which also tightens one-half of plates 194 and 196. Bar 198 traps the conveyor's main frame against bar 200.

Bar 200, when tightened by bolt 204, clamps the conveyor's main frame as clamp 186 does. Bolt 204 also clamps against bars 194 and 196 against tube or bar 206. When bolts 192 and 204 are loosened, the mounting assembly can be slid the length of the conveyor section. At the same time, the tube or bar 206 can be adjusted left or right as shown in FIG. 4B. The adjustable mount can be utilized for numerous functions; for example, unloading of the conveyor equipment, stabilizing the conveyor sections, or hanging the transfer conveyor itself.

Figure 4C:
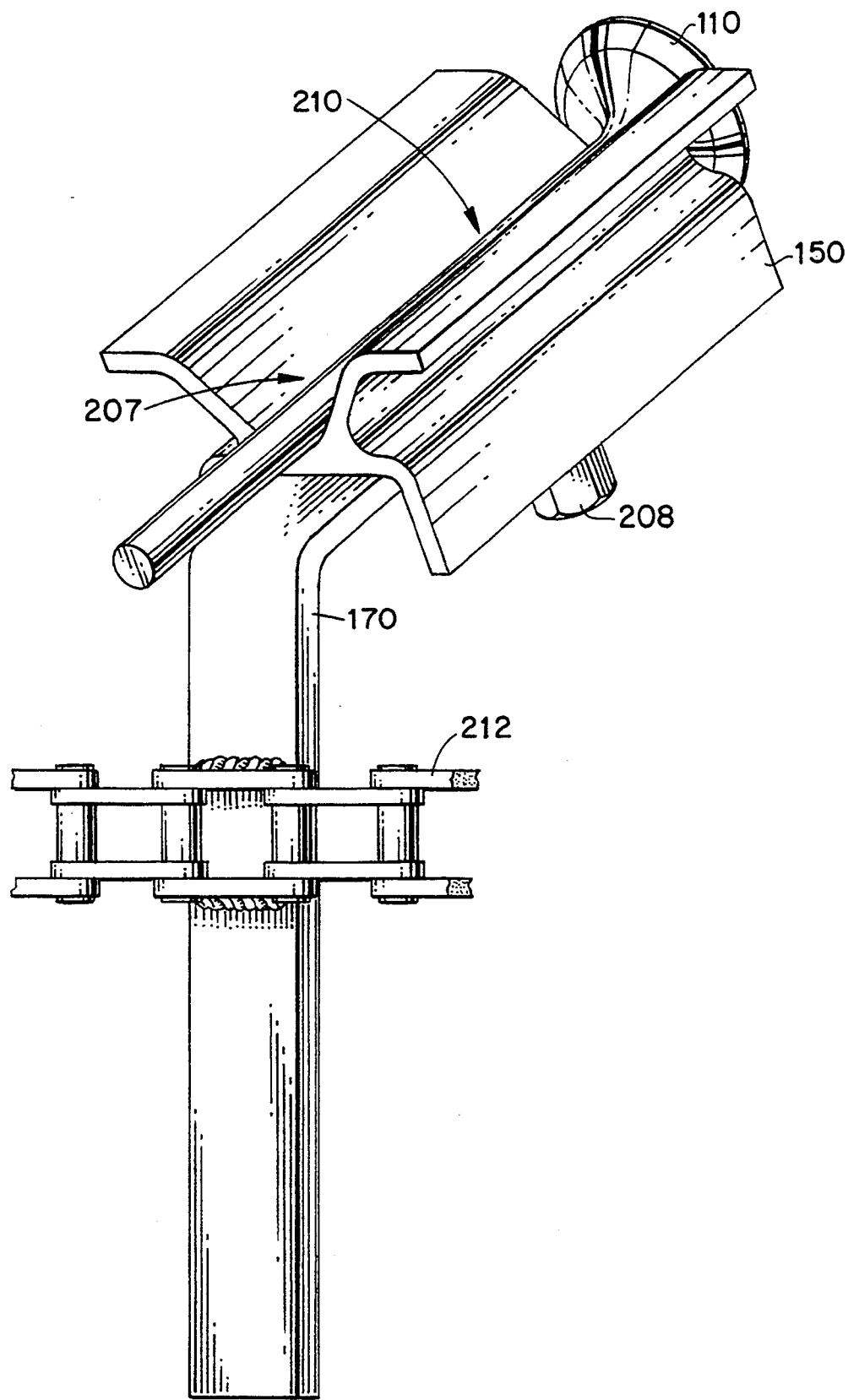
FIG. 4C is pictorial view showing a single carrier and a flight which is attached to the conveyor chain.

As can be seen from FIG. 4C, carrier 150 includes pocket 207 for receiving workpiece 110. Carrier 150 is of a gull-wing shape to close all gaps between adjacent carriers to prevent workpieces 110, or other extraneous materials, from getting caught between them. Also, it is shaped to enable a smooth and certain entry of a workpiece into the pocket 150 and to handle a variety of different sized, or shaped, headed workpieces.

A long nut or stud 208 protruding past the carrier (1) serves two purposes: to fasten the carrier 150 to the flight 170 which is a flat bar which is bent to accommodate the desired degree of angle of the carrier and to accurately determine when the carrier is centered at a particular position by the long nut sensed by sensing device 152. The flight 170 has one hole in it above the bend of the flight to bolt through the carrier 150 to the flight 170 using a flat head screw at location 210 which screws into a long nut 208.

The roller chain 212 is a common commercially available roller chain. The flight 170 is affixed to the roller chain 212 by either welding or by bolting. The roller chain 212 can be purchased with flanges paralleling the flights with holes in the flanges of the roller chain which are commonly referred to as "K" attachments. The roller chain 212 has an edge to support the chain assembly 178 which rides on bar 176. The carriers 150 are fixed at an angle greater than 0° from the horizontal by the bend in flights 170. This angled orientation together with the head on workpieces 138 prevents the workpiece from falling out of the pocket 207 in carrier 150.

Figure 4D:
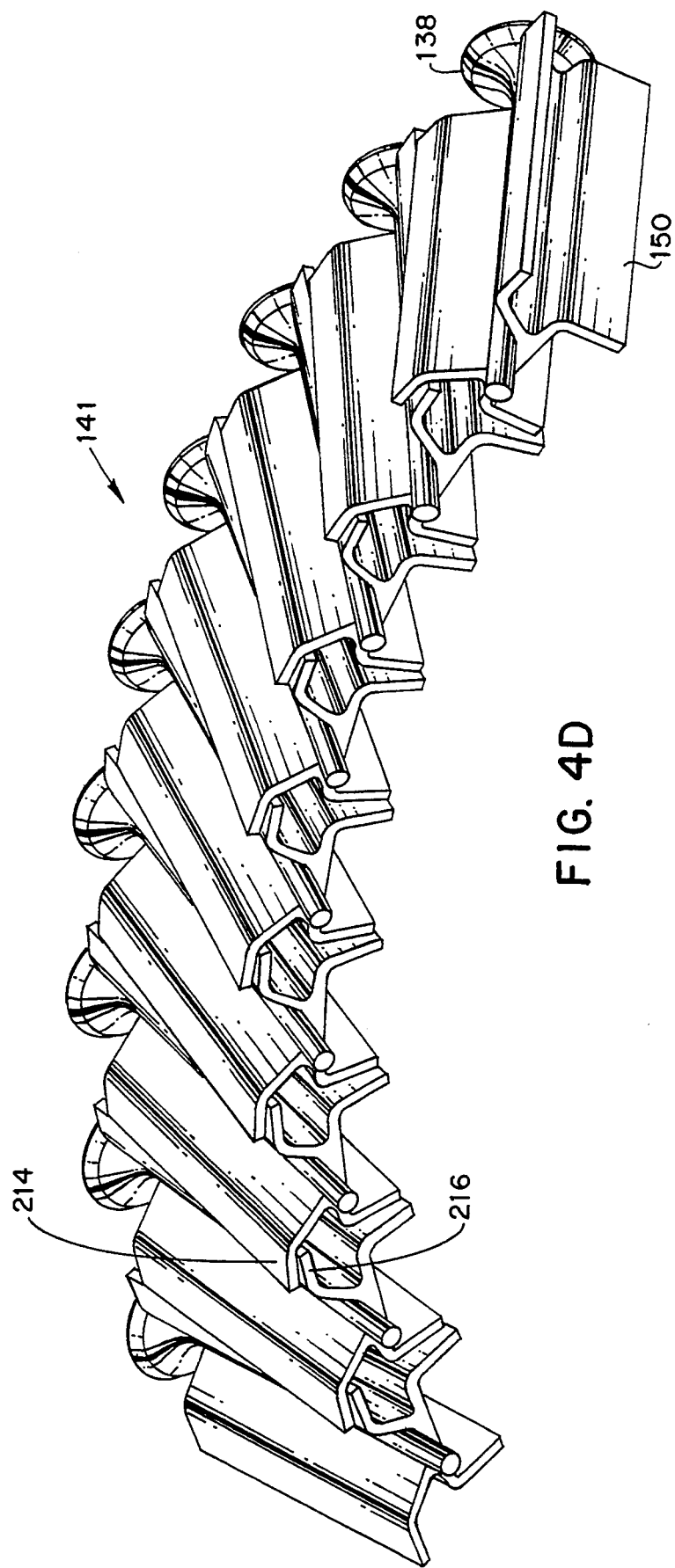
FIG. 4D is a sectional view showing a plurality of carriers illustrating the capability of the carrier to go around a curve when the chain goes around a sprocket.

FIG. 4D shows the capability of the gull-wing shaped carriers 110 to go around in a curve such as a chain sprocket shown in FIG. 1 at arrows #8 which is at the drive, #9 which is at the idler sprocket, and #7 which is at the take-ups. Since wings 214 and 216 of adjacent carriers overlap, they mesh together without interference with each other and without disturbing the workpieces 110. The overlap is accomplished because one wing of each carrier is at a greater elevation than its other wing.

Figure 4E:
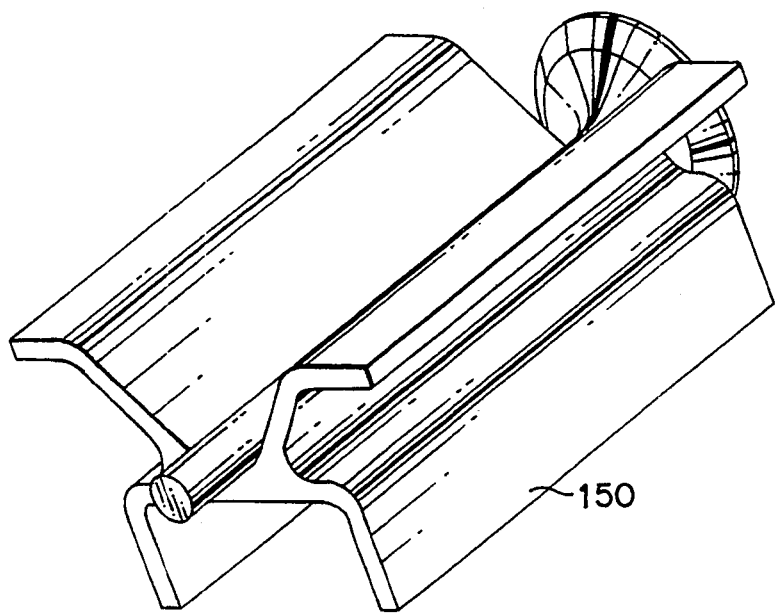
FIG. 4E is a pictorial view of a single carrier containing a single part.
Figure 4F:
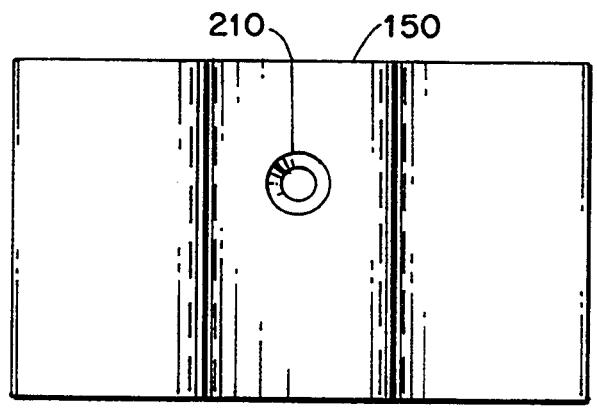
FIG. 4F is a top view of the carrier of FIG. 4E, however with the part having been removed.
Figure 4G:
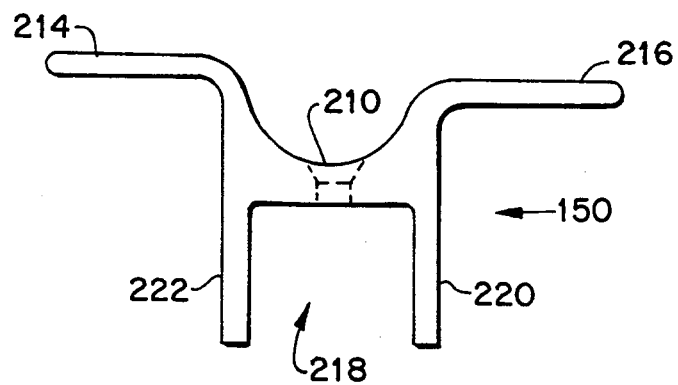
FIG. 4G is a end view of the carrier of FIG. 4E, however with the part removed.

FIGS. 4E–4G show the carrier 150 detached from the horizontal conveyor. The end view in FIG. 4G shows the gull-wing design with wing 216 lower than wing 214 to allow for overlapping of one to another thereby meshing when going around curves. Hole 210 is a single countersink hole for bolting to a flight bar. Gap 218 accommodates the width of the flight bar 173. The legs 220 and 222 of the carrier 150 are positioned on both sides of the flight bar to keep the carrier 150 straight and square to the flight bar using only one screw. The carrier can be extruded from plastic or an elastomer, or formed and/or fabricated from steel, or steel coated with elastomer or plastic depending upon the application.

Figure 4H:
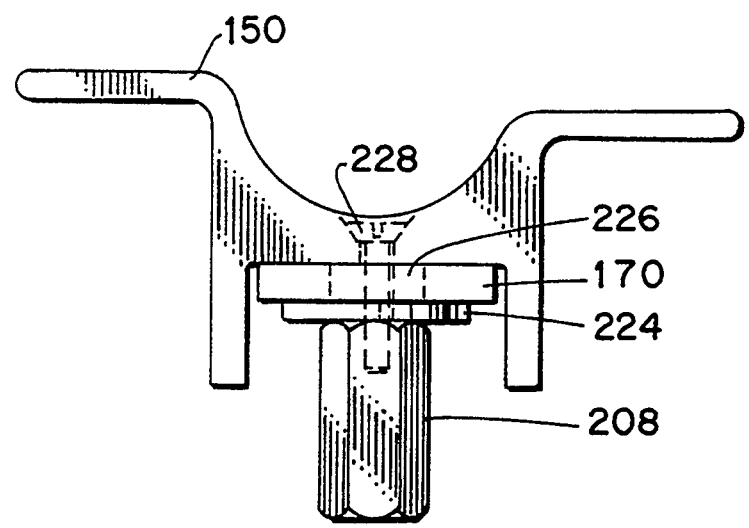
FIG. 4H is another end view of FIG. 4E, however showing the single long nut attaching the carrier to the flight.
Figure 4I:
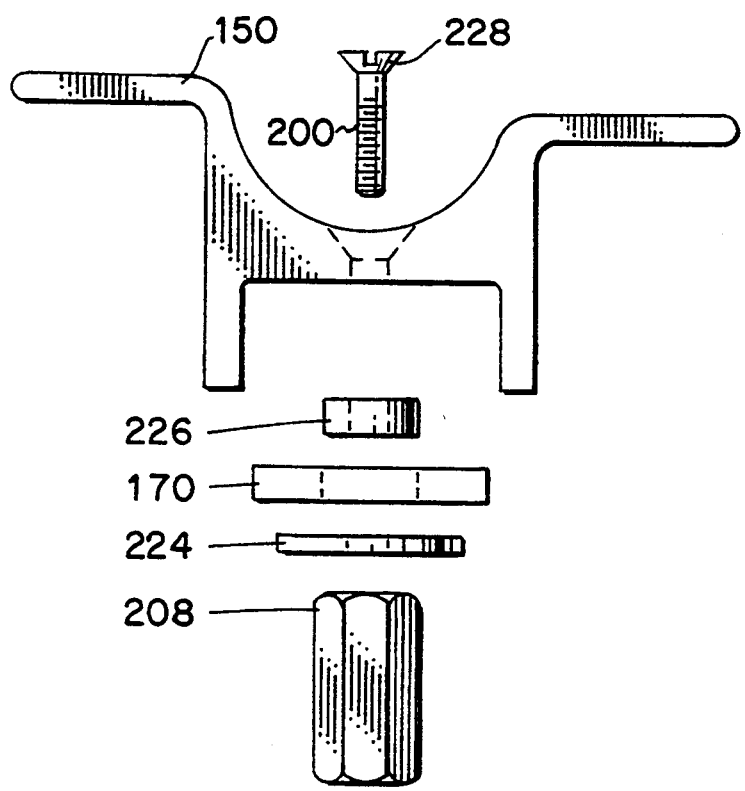
FIG. 4I is an exploded view of FIG. 4H.

FIGS. 4H and 4I show a configuration of fastening the carrier 150 to the flight 170 in such a manner that if for some reason the carrier 150 is caught on something and subsequently gets torn off, the long nut 208, the washer 224, the bushing 226 and the flat head screw 228 would fall out. The advantage of this being if a carrier 150 is torn off and the long nut 208 remains on the flight bar 170, it would cause a false reading such as at arrow (3) in FIG. 1 during the loading of the horizontal conveyor because the long nut 208 is being used as part of the sensing apparatus. In other words, at the loading of the horizontal conveyor there are two sensing devices—one to determine whether or not a workpiece is in the carrier 150 and one to sense the precise location of the carrier using the long nut 208. An attempt to load horizontal conveyor is not desired if there is not a carrier. This is why it is advantageous to have the long nut fall out. The hole in the flight bar 170 is larger than the head of the screw 228. The bushing 226 holds the gap between the screw shank 230 and the hole in the flight bar 170.

FIGS. 5A and 5B show unloading apparatus for the horizontal conveyor. This is done by tipping the head of the headed workpiece 110 over the edge of the carrier 150 and then it slides into a funnel 234, stem end first, and then slides down a flexible tube 246. Pusher 236, which can be made from plastic or steel, is connected to a bearinged shaft and frame which is powered by an air cylinder 238 arrangement which may be the same as the one shown in FIG. 3D. The funnel 234 is made of plastic or steel and is held in place and mated to the flexible tube by a pipe 239 which is cut in half and held together by a U-bolt 240. Both the pusher and the funnel tube arrangement are mounted to an adjustable mount 242 which clamps to the horizontal conveyor. As the receiver/accumulator 145 below requires parts, a signal from the system controller is sent to the unloading apparatus, then the sensor 244 senses the next available workpiece going by and tipped, and slides off the carrier 150 into the funnel 234.

FIGS. 6A and 6B show the receiver/accumulator 145, and the one at a time escapement that is mounted to a process machine. The flex tube 246 carries the workpiece from the unloader above through drop tube 248. The flex tube and drop tube are supported by a frame and steel pipe 250, also using a hinge 252 and tightening screw 254.

Figure 6E:
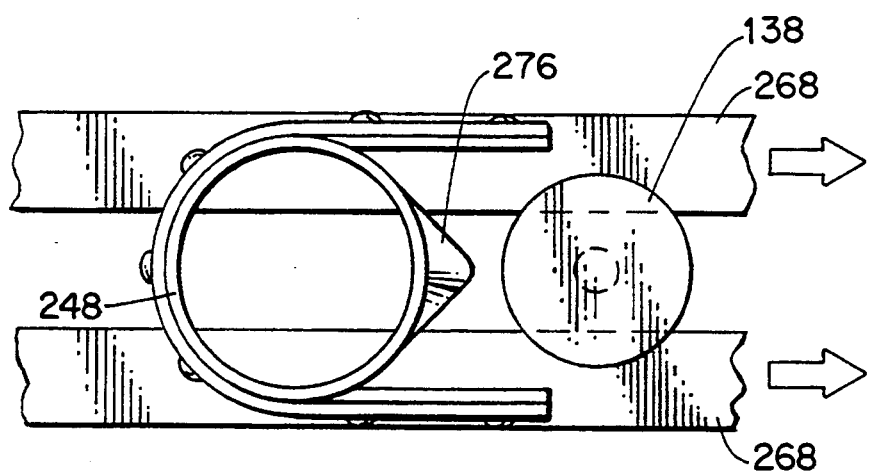
FIG. 6E is a top view of FIG. 6D.
Figure 6D:
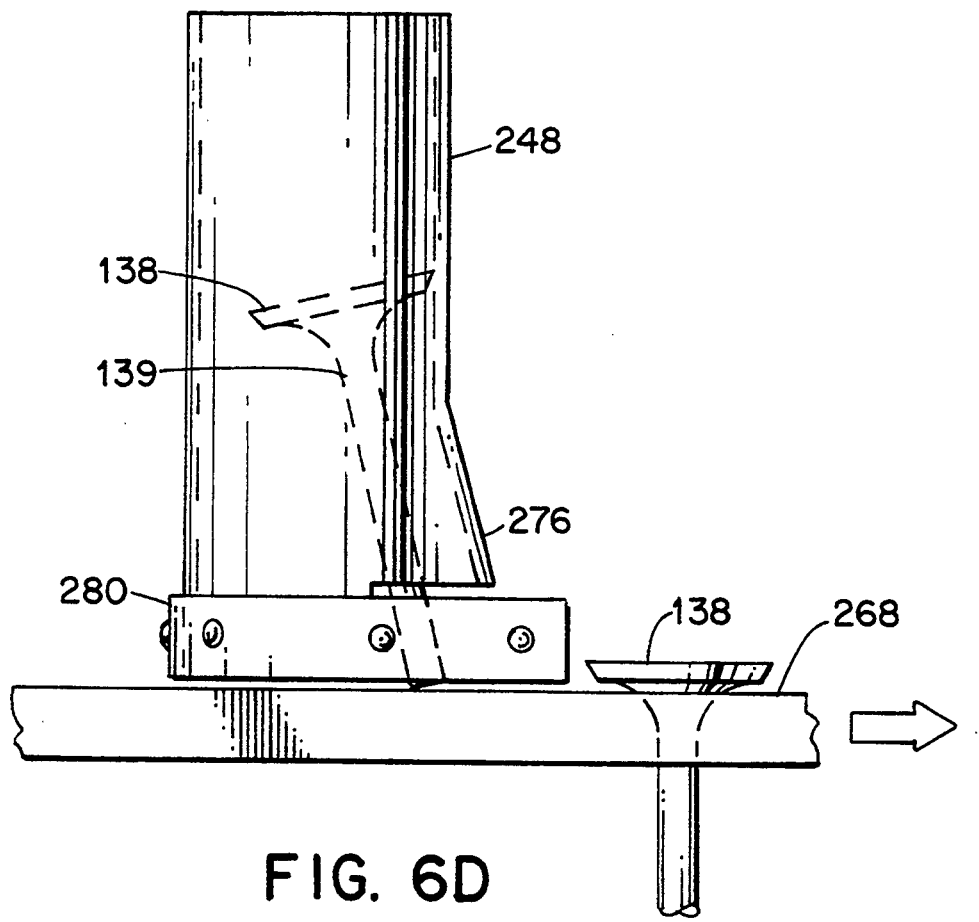
FIG. 6D is a side elevational view illustrating the drop tube of FIG. 6A in more detail.

A full description of the drop tube 248 is explained in reference to FIGS. 6C and 6D. The main unit is a double belt, or chain, conveyor configuration consisting of two conveyor sections 256 and four pulleys 258 (of which two are driven and two are idlers) with two exterior bearings 260 on the driven pulleys on a mounting 262 driven through a coupling 264, by a motor 266.

The workpiece 138 slides down the drop tube 248. The stem of the workpiece drops between the belts 268 and the workpiece 138 is hung by its head on the belts 268 and is accumulated on the belts and held back by the one at a time escapement 270. The workpieces accumulate and back up until a full condition is achieved and is sensed by a sensor 272. Sensor 272 communicates to the system controller when there is, or is not, a full condition which the system controller communicates to the unloader for workpieces. Sensor 274 checks the drop tube 248 to make sure that the workpiece is out of the drop tube area. To avoid impact of another workpiece from above, the escapement 270 will release one workpiece at a time when the process machine calls for it. The cover 275 keeps the workpieces from "bunching up" when backed up.

FIGS. 6D and 6E show in detail the situation where the workpiece 138 lands on one of the belts 268 instead of falling directly between the belts. If the stem 139 falls and lands on belt 268, then the belt will pull the stem forward until it falls between the belts due to the parabolic shaped protrusion 276 of the drop tube 248. A steel bar 280 is affixed to the bottom of the drop tube to hold the shape of the tube.

The foregoing description of the preferred embodiment represents an exemplification of the invention only. It should be apparent that many modifications may be made therein without departing from the true spirit and scope of the invention.

We claim:
1. A material handling system comprising:
   a conveyor including an endless belt for moving workpieces;
   a plurality of pick-ups attached to said endless belt; each of said pick-ups including a pair of adjacent substantially L-shaped members for holding the workpieces; each L-shaped member being integrally constructed; said conveyor including a plurality of bars; said L-shaped members of a pair being mounted to a single one of said bars; each pair of said L-shaped members formed by a pair of substantially parallel plates; a gap formed between said adjacent parallel plates; each of said substantially parallel plates having a substantially vertically upwardly extending leg and a substantially horizontally extending leg which, together with said gap, forms a cradle for receiving said workpieces.

2. A material handling system as set forth in claim 1 further including apparatus for loading the workpieces onto said pick-ups; portions of said apparatus for loading being located from time to time within said gap between said L-shaped members.

3. A material handling system as set forth in claim 2 wherein said apparatus for loading is a gravity fed track.

4. A material handling system as set forth in claim 1 further including apparatus for unloading the workpieces from said pick-ups; said apparatus for unloading the workpieces located from time to time within said gap between said L-shaped members.

5. A material handling system as set forth in claim 4 further including apparatus for receiving the workpieces from said pick-ups.

6. A material handling system as set forth in claim 5 wherein said apparatus for receiving includes a gravity track.

7. A material handling system as set forth in claim 6 further including a second conveyor; said second conveyor including a plurality of carriers; apparatus for selectively depositing workpieces on said carriers from said gravity track; each carrier receiving a single workpiece.

8. A material handling system as set forth in claim 7 wherein said apparatus for selectively depositing includes a first gate received in said gravity track.

9. A material handling system as set forth in claim 1 wherein each L-shaped member is made of a non-abrasive material whereby said L-shaped members are enabled to handle precision workpieces without damaging the workpieces.

10. A material handling system as set forth in claim 1 further including a plurality of flights attached to said endless belt; each bar attached to a flight; a guide rail; said guide rail juxtaposed to each flight for stabilizing said flights.

11. A material handling system as set forth in claim 1 further including a chain forming a part of said belt; a guide member juxtaposed to said chain for guiding said chain.

* * * * *